Figure 1:
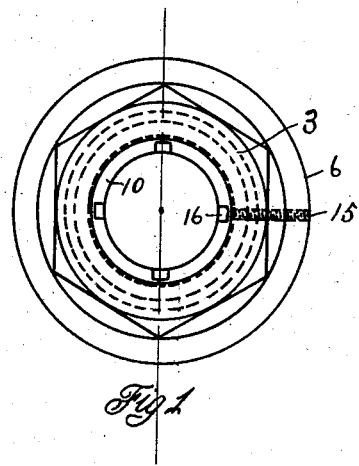

L. F. BREAKER.
PIPE CONNECTION.
APPLICATION FILED FEB. 20, 1911.

1,027,586.

Patented May 28, 1912.

Witnesses.
E. Fruehbach
G. T. Dougherty.

Inventor
Lewis F. Breaker.
By
Hardway & Cathey
Attorneys

UNITED STATES PATENT OFFICE.

LEWIS F. BREAKER, OF HOUSTON, TEXAS.

PIPE CONNECTION.

1,027,586. Specification of Letters Patent. Patented May 28, 1912.

Application filed February 20, 1911. Serial No. 609,559.

*To all whom it may concern:*

Be it known that I, LEWIS F. BREAKER, a citizen of the United States, residing at Houston, in the county of Harris and State of Texas, have invented certain new and useful Improvements in Pipe Connections, of which the following is a specification.

My invention relates to new and useful improvements in pipe connections, and more particularly to that class of such connections as are adapted to be used to connect pipe sections composed of metal or other hard material.

The invention comprehends a plurality of pipe sections, each provided with joint-members, said members being so formed as to be readily united with each other, and means for securing the union of said members.

The object of the invention is to provide a connection of the character described, which will permit the independent rotation, or swiveling, of the pipe sections relative to each other, irrespective of the inflexible nature of the material of which the said sections are composed.

A further feature of the invention resides in the novel construction and arrangement of the co-acting parts of the connection, by reason of which, the pipe or hose sections may turn or swivel relative to each other, without any constriction of the passageway through said pipe; and a still further and important feature of the invention resides in the construction of the connection, whereby any internal pressure upon said connection outwardly, operates to hold the joint members the more securely together, thereby providing a hose specially adapted to withstand great internal pressure and at the same time be composed of sections which are movable relative to each other.

A still further feature of the invention resides in the provision of a novelly shaped gasket interposed between the co-acting parts of the connection which renders the joint impervious to fluid passage. A pipe whose sections are united by this form of connection will be especially adapted to be used on railway cars to take the place of the rubber hose connection now in common use.

Finally, the object of the invention is to provide a connection of the character described, that will be easily constructed, simple, easily taken apart and united together, and one which will be efficient and easily kept in working order.

With the above and other objects in view, my invention has particular relation to certain novel features of construction, operation, and arrangement of parts, an example of which is given in this specification, and illustrated in the accompanying drawing, wherein:—

Figure 2:
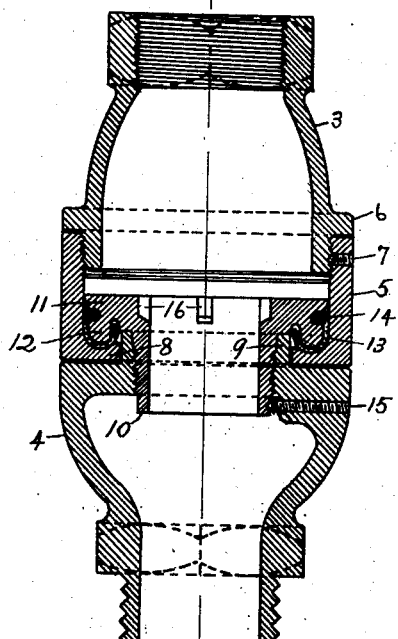

Figure 1 is an end view of the connection looking toward the upper end of Fig. 2, and Fig. 2, is a longitudinal section thereof.

Referring now more particularly to the drawings, wherein like numerals of reference designate similar parts in each of the figures, the numerals 3 and 4 refer, respectively, to joint members. The outer end of joint-member 3 is internally threaded to receive a correspondingly threaded end of a pipe section, and the outer end of joint-member 4 is externally threaded for a similar purpose, the joint members being substantially tubular so as to provide a fluid passageway therethrough.

The numeral 5 refers to a connecting sleeve which is screwed on to the inner end of joint member 3 and abuts against an annular rim or shoulder 6 carried by said joint-member. A set screw 7 passes through this sleeve and engages in a suitable recess in said joint member and prevents the sleeve from unscrewing from said member. The free end of this sleeve carries an inwardly extending annular flange, or rim, 8 whose inner face is grooved, as shown, for a purpose to be hereinafter set forth. The inner end of joint-member 4 abuts against the free end of the connecting sleeve 5 and carries a reduced neck 9 which extends through a central opening of the annular flange 8.

The numeral 10 designates an internal connecting sleeve which is cylindrical in shape and is provided with a central passageway therethrough and which screws into the inner end of the joint-member 4 and is surrounded by the neck 9. The free end of this sleeve carries an overhanging annular flange 11, from which depends an annular rib 12, which coincides with and fits into the groove carried upon the inner face of the rim 8 of connecting sleeves 5. The free end of neck 9 is ground smooth and fits against a corresponding ground seat carried upon the under side of flange 11 and forms a perfectly tight joint.

Interposed between sleeves 5 and 10 and surrounding rib 12 is a gasket 13, composed of rubber or some similar material, which is designed to prevent the escape of air, or other fluid between the coacting parts of the connection. An expanding ring 14, composed of steel or other similar material, rests in an annular groove surrounding rib 12 and presses against the inner side of the upper edge of said gasket and holds the same firmly against the sleeve 5 and thus assists in the prevention of the escape of air or fluid between the sleeves, between which said gasket is located. The internal sleeve 10 is held against unscrewing by means of a set screw 15 which is carried by joint-member 4 and projects into a suitable recess in the periphery of said internal sleeve. The flange 11 of internal sleeve 10, is provided with suitable recesses 16 in which the implement for screwing said sleeve in place may engage.

The parts of said connection are assembled in the following manner:—The sleeve 5 is first placed in its proper position relative to joint member 4 and the gasket 13 is then inserted in said sleeve in the position shown in Fig. 2. The internal sleeve 10 is then screwed into the joint-member 4, passing through the neck 9, until the rib 12 is firmly seated in the groove in the inner face of flange 8 and rests firmly against the gasket. The set screw 15 is then secured in place. The joint-member 3 is then screwed into sleeve 5 until the shoulder 6 abuts firmly against the end of the sleeve and the set screw 7 passes through said sleeve and into its recess in said joint member; and the joint members are thus locked together.

A pipe connection constructed as set forth in this specification, and illustrated in the drawings which accompany the same will not only be compact and practical but will be found to be capable of resisting great internal pressure, and a pipe constructed of sections united by this form of connection will be found to be very efficient as a substitute for the rubber hose, which is now in common use in railroad car couplings and will be found useful wherever power is to be transmitted through hose or tubing; and the joints or connections will not be so cumbersome or so liable to disconnection as the couplings now in common use.

What I claim is:—

1. A coupling of the character described composed of two joint-members, a connecting sleeve secured upon each of said joint-members, overhanging flanges carried by the free ends of said sleeves, an annular rib carried by one of said flanges and coinciding with and fitting into a corresponding groove provided in the other of said flanges, a gasket surrounding said rib and resting in said groove, and an expanding ring surrounding said rib and resting against said gasket and holding the same in place in said groove.

2. A coupling of the character described composed of two joint-members, connecting sleeve secured upon each of said joint members, means for locking said sleeves on their respective joint members, overhanging flanges carried by the free ends of said sleeves, an annular rib carried by one of said flanges and coinciding with and fitting into a corresponding groove provided in the other of said flanges, a gasket surrounding said rib and resting in said groove, and an expanding ring surrounding said rib and resting against said gasket and holding the same in place in said groove.

3. A coupling of the character described composed of two joint-members, a connecting sleeve secured upon each of said joint members, a set screw locking each sleeve in engagement with the joint-member, overhanging flanges carried by the free ends of said sleeves, an annular rib carried by one of said flanges and coinciding with and fitting into a corresponding groove provided in the other of said flanges, a gasket surrounding said rib and resting in said groove, and an expanding ring surrounding said rib and resting against said gasket and holding the same in place in said groove.

In testimony whereof I have signed my name to this specification in the presence of two subscribing witnesses.

LEWIS F. BREAKER.

Witnesses:
J. W. YEAGLEY,
A. TOMPKINS.

Copies of this patent may be obtained for five cents each, by addressing the "Commissioner of Patents, Washington, D. C."